(12) United States Patent
Yeom et al.

(10) Patent No.: US 6,529,496 B1
(45) Date of Patent: Mar. 4, 2003

(54) TSTD TRANSMITTER FOR LIMITING TRANSMISSION POWER OF ANTENNA AND CONTROLLING METHOD THEREOF FOR BASE STATION IN MOBILE COMMUNICATION SYSTEM

(75) Inventors: Jae-Heung Yeom, Seoul (KR);
Soon-Young Yoon, Seoul (KR);
Jae-Min Ahn, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/365,797

(22) Filed: Aug. 3, 1999

(30) Foreign Application Priority Data

Aug. 3, 1998 (KR) .............................................. 98-31569

(51) Int. Cl.[7] ................................................. H04J 3/00
(52) U.S. Cl. ....................... 370/345; 370/342; 455/101; 375/267; 343/876
(58) Field of Search ................................ 370/342, 320, 370/335, 318, 345; 455/522, 101; 375/267, 299, 347, 146; 343/876

(56) References Cited

U.S. PATENT DOCUMENTS 5,787,122 A  *  7/1998 Suzuki ........................ 375/299

OTHER PUBLICATIONS

"Transmission Diversity in Wideband CDMA", Ratiola, M., Hottinen, A., Wichman, R, Vehicular Technology Conference, 1999 IEEE 49th, vol. 2, 1999, pp. 1545–1549.*

* cited by examiner

Primary Examiner—Vivian Chin
Assistant Examiner—James K Moore
(74) Attorney, Agent, or Firm—Dilworth & Barrese, LLP

(57) ABSTRACT

A device and method are provided for limiting a power of a signal transmitted through any antenna to a maximum transmission power of the antenna in a TSTD (Time-Switched Transmission Diversity) transmitter of a base station of a mobile communication system. In a TSTD transmitter including at least two antennas and a pattern storage for storing a maximum transmission power limit value and switching patterns of a plurality of user data to be transmitted through the antennas, transmission powers assigned to antennas are measured upon receipt of new user data. A switching pattern is determined such that a value obtained by adding one of the transmission powers to a transmission power of the new user data does not exceed the maximum transmission power limit value.

9 Claims, 8 Drawing Sheets

NON-TSTD

1st ANTENNA

2nd ANTENNA

TSTD TRANSMITTER FOR LIMITING TRANSMISSION POWER OF ANTENNA AND CONTROLLING METHOD THEREOF FOR BASE STATION IN MOBILE COMMUNICATION SYSTEM

BACKGROUND OF THE INVENTION

1. Field of the Invention

The present invention relates to a time-switched transmission diversity (TSTD) transmitter and a controlling method thereof in a code division multiple access (CDMA) mobile communication system, and more particularly, to a TSTD transmitter for limiting a power of a signal transmitted through any antenna to a maximum transmission power of the antenna and a controlling method thereof.

2. Description of the Related Art

In a mobile communication system, received signal levels relating to transmission of a radio frequency signal change rapidly. A rapid change in the receiving signal level is called fading. To reduce fading, a reception diversity scheme is used in which the number or arrangement of antennas in a mobile terminal is changed to improve reception sensitivity over that of a mobile terminal having a single antenna. Although the reception diversity scheme has improved reception performance, it has scarcely been used due of the required increased complexity of the mobile terminal and the resulting increase in cost.

Another option for reducing fading is using a third generation mobile communication system, such as an IMT-200 system, which attains the effect of reception diversity by using transmission diversity. In transmission diversity a plurality of antennas are installed in a base station instead of a mobile terminal. If the mobile station moves slowly (i.e., if the Doppler frequency is low) and if there are a small number of multiple paths (i.e., if there is little delay spread), the transmission diversity can obtain a diversity effect of up to 4–7 dB. Transmission diversity is typically classified into orthogonal transmission diversity (OTD), time-switched transmission diversity (TSTD), and selective transmission diversity (STD).

FIG. 1 illustrates a conventional OTD transmitter. Data is separated equally by a data separator 101 and then transmitted through first and second antennas via multiplexers (MUXs)102, serial/parallel (S/P) converters 103, mixers 104 and 105, complex PN (Pseudo Noise) spreaders 107, low-pass filters (LPFs) 109, mixers 110 and 111, and adders 112. An OTD transmitter, as shown in FIG. 1, requires an amplifier with half the power of a conventional power amplifier, since data is equally separated.

FIG. 2 illustrates a conventional TSTD transmitter. A MUX 113 converts logical signals "0" and "1" into actual transmission signals "+1" and "−1". An S/P converter 114 separately outputs even symbols and odd symbols. The even symbols are multiplied by an orthogonal code in a mixer 115 and then provided to a complex PN spreader 117, and the odd symbols are multiplied by the orthogonal code in a mixer 116 and then provided to the complex PN spreader 117. The complex PN spreader 117 complex-multiplies the outputs of the mixers 115 and 116 by I-channel and Q-channel data PN_I and PN_Q. A switching circuit 125 switches data which is separately output by the complex PN spreader 117 into data corresponding to the number of antennas to either one of two pairs of corresponding LPFs 119 and 120. A controller 121 controls the switching circuit 125 to switch user data in the unit of slots as shown in FIG. 3. The output of the LPF 119 is multiplied by a carrier frequency signal in a mixer 122 and then provided to an adder 124. The output of the LPF 120 is multiplied by a 90° phase-shifted carrier frequency signal in a mixer 123 and then provided to the adder 124. The adder 124 adds the outputs of the mixers 122 and 123 to each other and transmits the added result via a corresponding antenna.

When data is switched in the unit of slots in the conventional TSTD scheme, a power $P_o$ assigned to the first antenna at a current period and a power $P_e$ assigned to the second antenna at a current period are not equally distributed, as is illustrated in FIGS. 4B and 4C. FIG. 4A illustrates the transmission power for a NON-TSTD mode. The NON-TSTD mode illustrated in FIG. 4A needs one transmission amplifier, whereas the TSTD mode illustrated in FIGS. 4B and 4C requires, in the worst case, as many transmission amplifiers as the number of antennas.

As described above, a TSTD base station requires more transmission amplifiers than a non-TSTD base station and also requires the transmission amplifier to have a higher power than the transmission amplifier used in an OTD base station. This disadvantage regarding the TSTD base station results in increased cost and complexity when compared to non-TSTD base stations or OTD base stations.

In the TSTD mode, the power of a signal transmitted through any antenna may exceed a maximum transmission power of the antenna even if transmission amplifiers are provided with respect to every antenna, in which case, the signal may be lost.

SUMMARY OF THE INVENTION

It is, therefore, an object of the present invention to provide a device and method for limiting the power of a signal transmitted through any antenna to a maximum transmission power of the antenna in a TSTD transmitter.

It is another object of the present invention to provide a device and method for limiting a transmission power of an antenna by changing user data to a switching pattern of another antenna which does not exceed a maximum transmission power whenever the power of a signal transmitted through any antenna exceeds a maximum transmission power of that antenna.

In accordance with one aspect of the present invention, a device for limiting a transmission power of an antenna in a TSTD transmitter of a base station of a mobile communication system is provided, which comprises at least two antennas, a plurality of user channels, and a switching controller connected to the user channels, for switching user data received through the user channels to the antennas. The device includes a data state detector connected to the user channels, for measuring a power of user data on the user channels, a transmission power detector for measuring transmission powers of signals transmitted through the antennas, and an antenna pattern processor for storing a maximum transmission power of the antennas and switching pattern information for previously assigned user data, determining a switching pattern for assigning the new user data to a specific antenna of which transmission power added to a power of the new user data does not exceed the maximum transmission power, and controlling the switching controller and updating the switching pattern information, according to the determined switching pattern.

In accordance with another aspect of the present invention, a method for limiting a transmission power of an antenna in a TSTD transmitter of a base station of a mobile communication system is provided, the system comprising at least two antennas and a pattern storage for storing a maximum transmission power limit value and switching patterns of a plurality of user data to be transmitted through the antennas. The method comprises the steps of measuring transmission powers assigned to the respective antennas upon receipt of new user data, and determining a switching pattern such that a value obtained by adding one of the transmission powers to a power of the new user data does not exceed the maximum transmission power limit value.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well known constructions or functions are not described in detail so as not to obscure the present invention.

The symbols and definitions used in the present invention are shown below. Assuming that the powers of the first and second antennas preceding a current period by one period are $P_A(n-1)$ and $P_B(n-1)$, respectively, and powers of the first and second antennas at a current period are $P_o$ and $P_e$, respectively, these powers can be defined as:

$$P_A(n-1) = \sum_{i=0}^{N_A} P_i^A(n-1) + \text{offset} \quad \text{Equation 1}$$

$$P_B(n-1) = \sum_{i=0}^{N_B} P_i^B(n-1) + \text{offset} \quad \text{Equation 2}$$

$$P_o = P_B(n-1) - \alpha \quad \text{Equation 3}$$

$$P_e = P_A(n-1) - \beta \quad \text{Equation 4}$$

where $P_i^A$ is a power of the i-th user channel in a group transmitted through the first antenna, $P_i^B$ is a power of the i-th user channel in a group transmitted through the second antenna, $N_A$ is the number of users in a group transmitted through the first antenna, $N_B$ is the number of users in a group transmitted through the second antenna, "offset" is a basically transmitted power, $\alpha$ is an extinguished power (due to users who stop calling) in a group transmitted through the first antenna at a current period, and $\beta$ is an extinguished power in a group transmitted through the second antenna at a current period.

A maximum transmission power of an antenna is defined as $P_{max}$ and a power of a newly assigned user channel as $P_{new}$.

Figure 1:
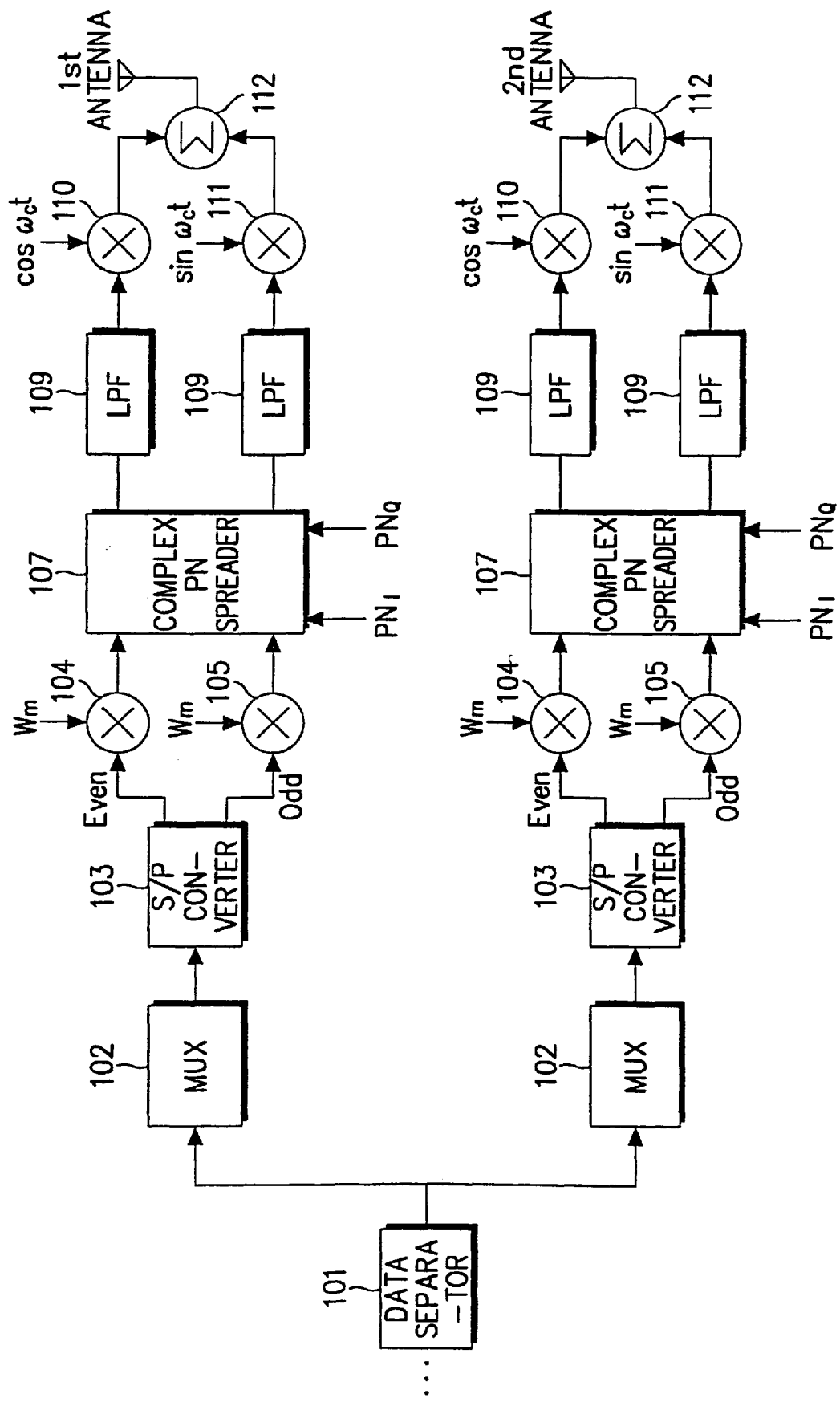
FIG. 1 is a block diagram illustrating a prior art OTD transmitter.
Figure 2:
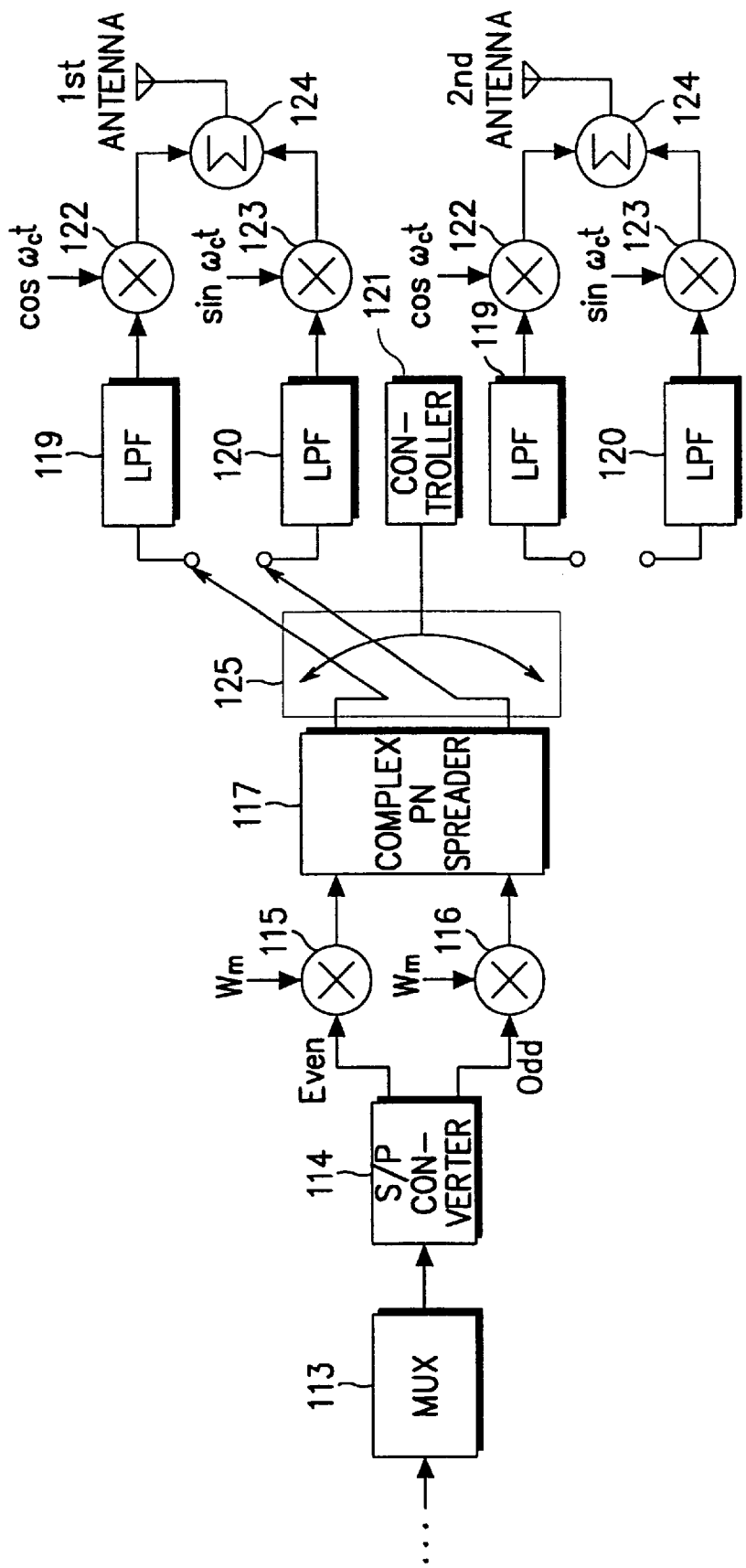
FIG. 2 is a block diagram illustrating a prior art TSTD transmitter.
Figure 3:
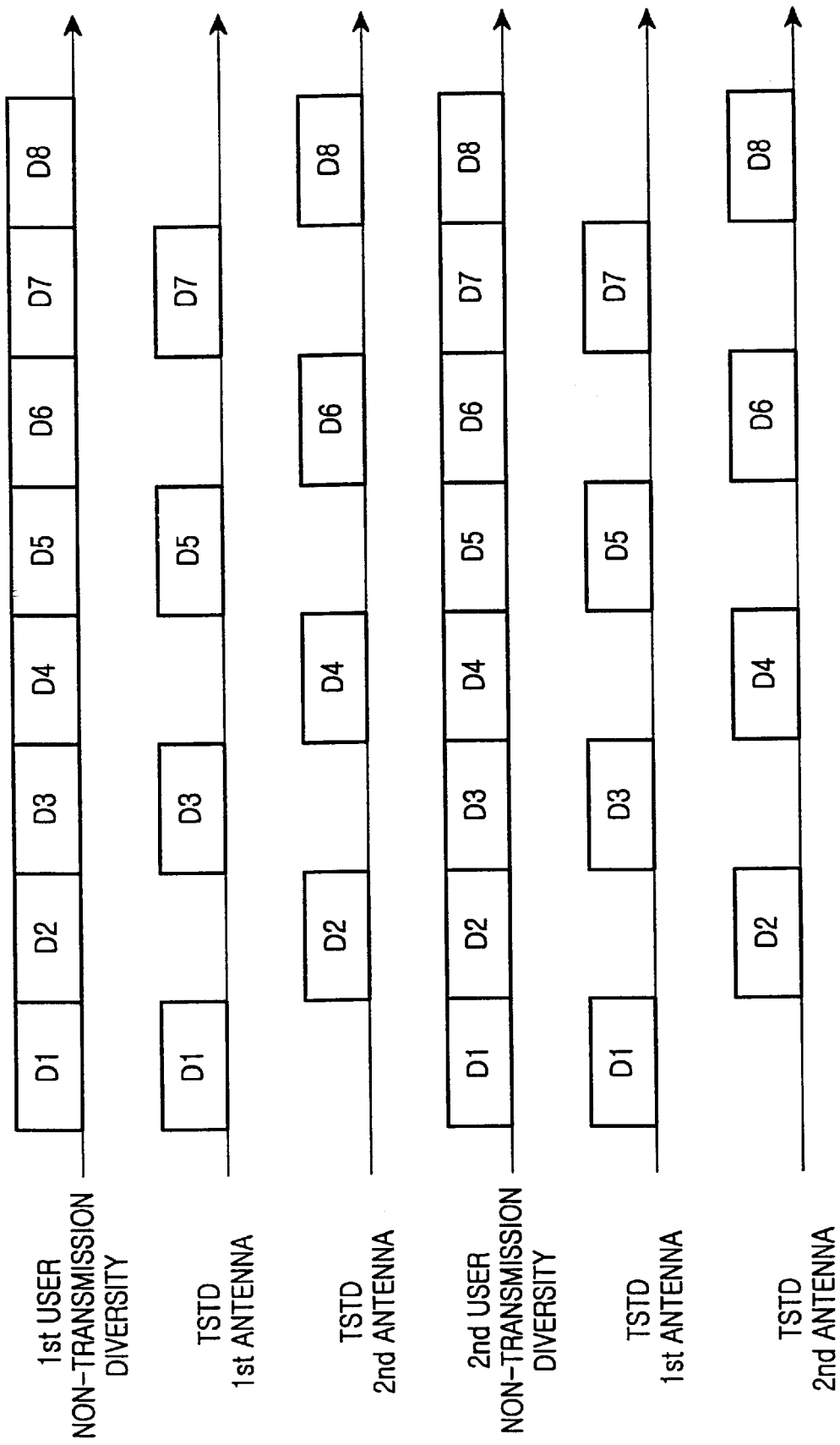
FIG. 3 illustrates examples of transmitting user data in a non-TSTD mode and a TSTD mode.
Figure 4A:
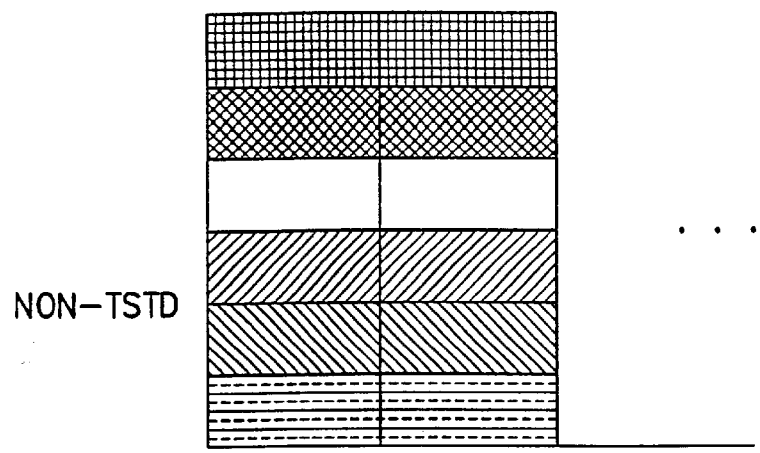
FIGS. 4A, 4B and 4C illustrate transmission powers in a non-TSTD mode and of first and second antennas in a TSTD mode.
Figure 4B:
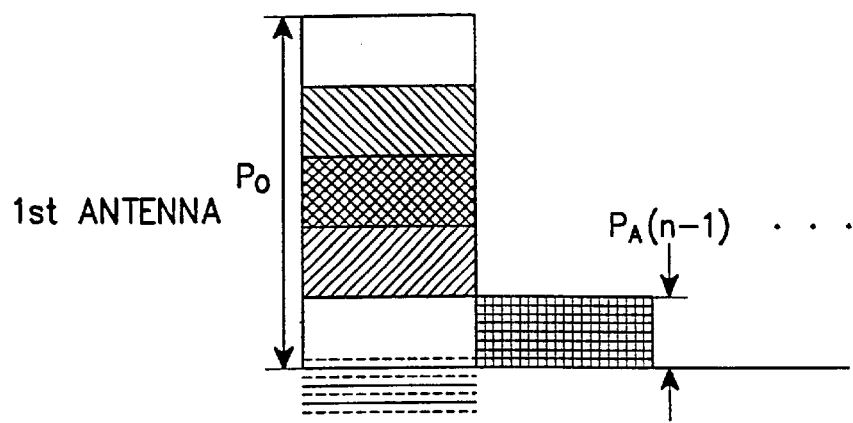
Figure 4C:
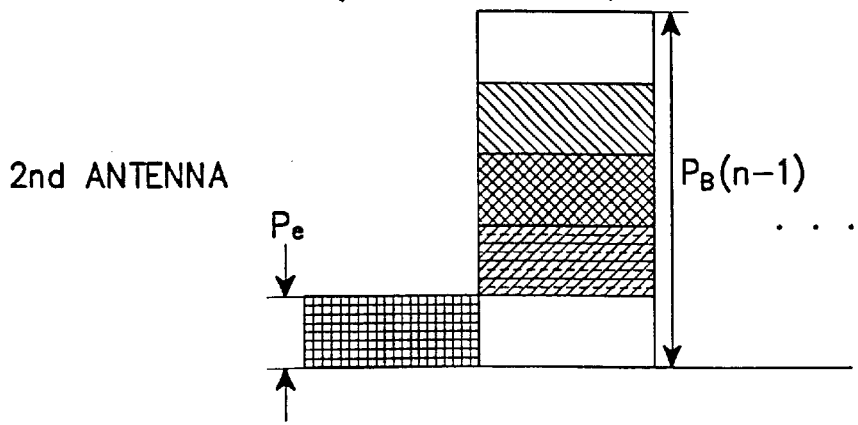
Figure 5:
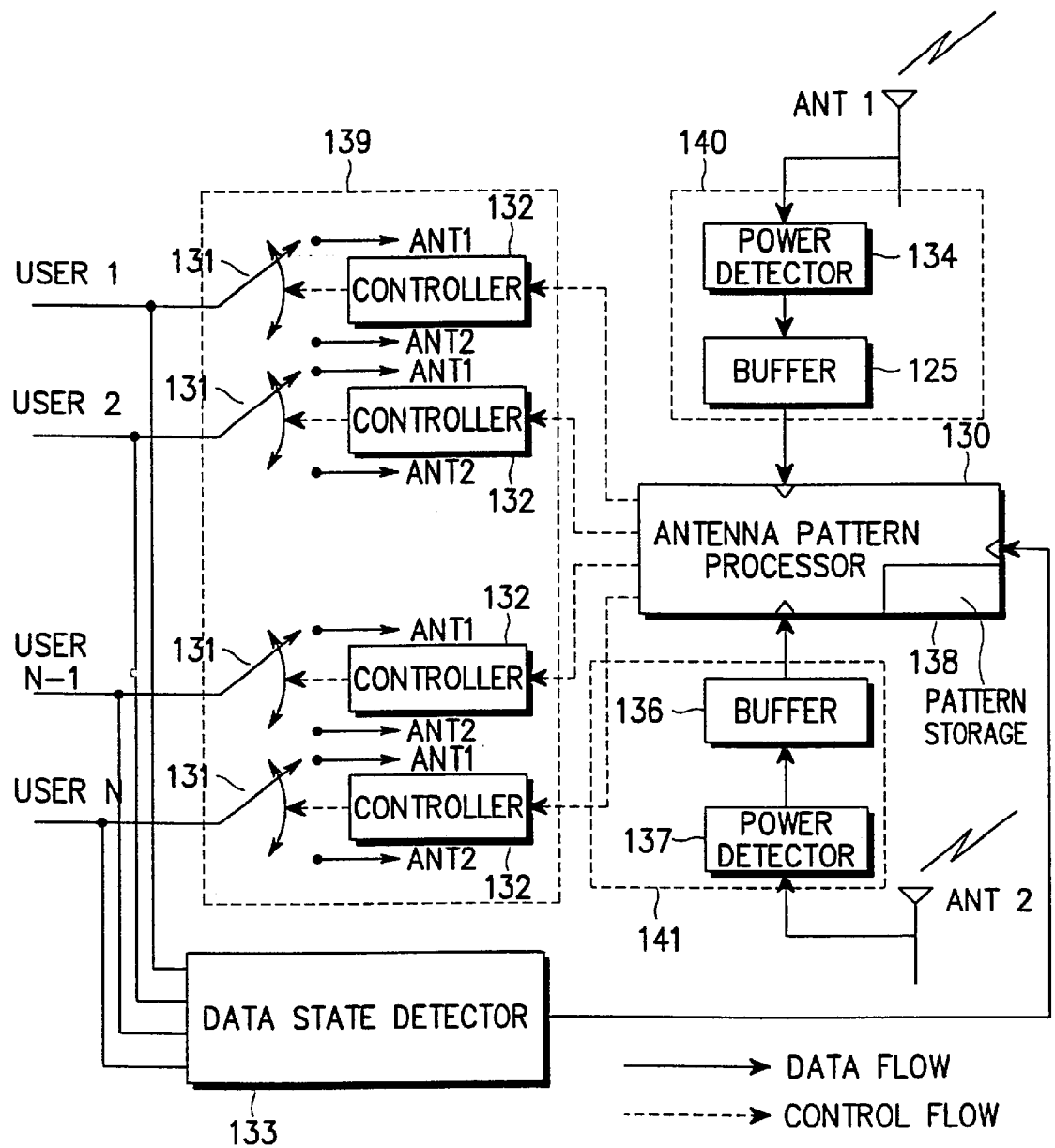
FIG. 5 is a block diagram illustrating a TSTD transmitter according to the present invention.

FIG. 5 illustrates a TSTD transmitter according to the present invention. The TSTD transmitter includes at least two antennas. In FIG. 5, the TSTD transmitter illustrated has two antennas.

Referring to FIG. 5, the TSTD transmitter includes a switching controller 139, a first transmission power detector 140, a second transmission power detector 141, an antenna pattern processor 130, and a data state detector 133. The switching controller 139 has a plurality of switching circuits 131 and controllers 132. The first transmission power detector 140 has a power detector 134 and a buffer 125. The second transmission power detector 141 has a power detector 137 and a buffer 136. The switching circuits 131 are coupled to respective user channels and switch user data input through corresponding channels to first and second antennas ANT1 and ANT2 as instructed by each respective controller 132. The controllers 132 are coupled to the switching circuits 131 and determine which of the two antennas is to be switched to the switching circuits 131 first as instructed by the antenna pattern processor 130.

The data state detector 133 is connected to the user channels. If new user data is received through the user channels, the data state detector 133 detects a power of the received data and provides the detected result to the antenna pattern processor 130. The data state detector 133 may also detect a data rate and quality of service (QoS). The first transmission power detector 140 is coupled to the first antenna ANT1 and detects the power of a signal transmitted through the first antenna ANT1. The detected transmission power is typically updated within the unit of a predetermined time interval, i.e., one period. The second transmission power detector 141 coupled to the second antenna ANT2 has the same configuration as the first transmission power detector 140. The power detector 134 of the first transmission power detector 140 measures the power of a transmission signal of the preceding stage of a transmission power amplifier (not shown) for amplifying the power of a signal to be transmitted through the first antenna ANT1; the power detector 137 of the second transmission power detector 141 measures the power of a transmission signal of the preceding stage of a transmission power amplifier (not shown) for amplifying the power of a signal to be transmitted through the second antenna ANT2.

The power value measured by the power detector 134 is stored in the buffer 135, and the power value measured by the power detector 137 is stored in the buffer 136. These buffers 135 and 136 store the measured power values during one period. It is assumed in the following description that the transmission power assigned to each antenna is the power of the preceding stage of each transmission power amplifier. The antenna pattern processor 130 includes a pattern storage 138 for storing a maximum transmission power $P_{max}$ value of the antennas and switching pattern information for assigned channels. The antenna pattern processor 130 determines a switching pattern of each user by analyzing information output from the data state detector 133 and power information stored in the buffers 135 and 136. The antenna pattern processor 130 also controls the controllers 132 and updates the pattern information of the pattern storage 138, according to the determined switching pattern. Upon receipt of information such as the data rate or QoS from the data state detector 133, the antenna pattern processor 130 may determine the switching pattern with priority according to the data rate or QoS.

Figure 6:
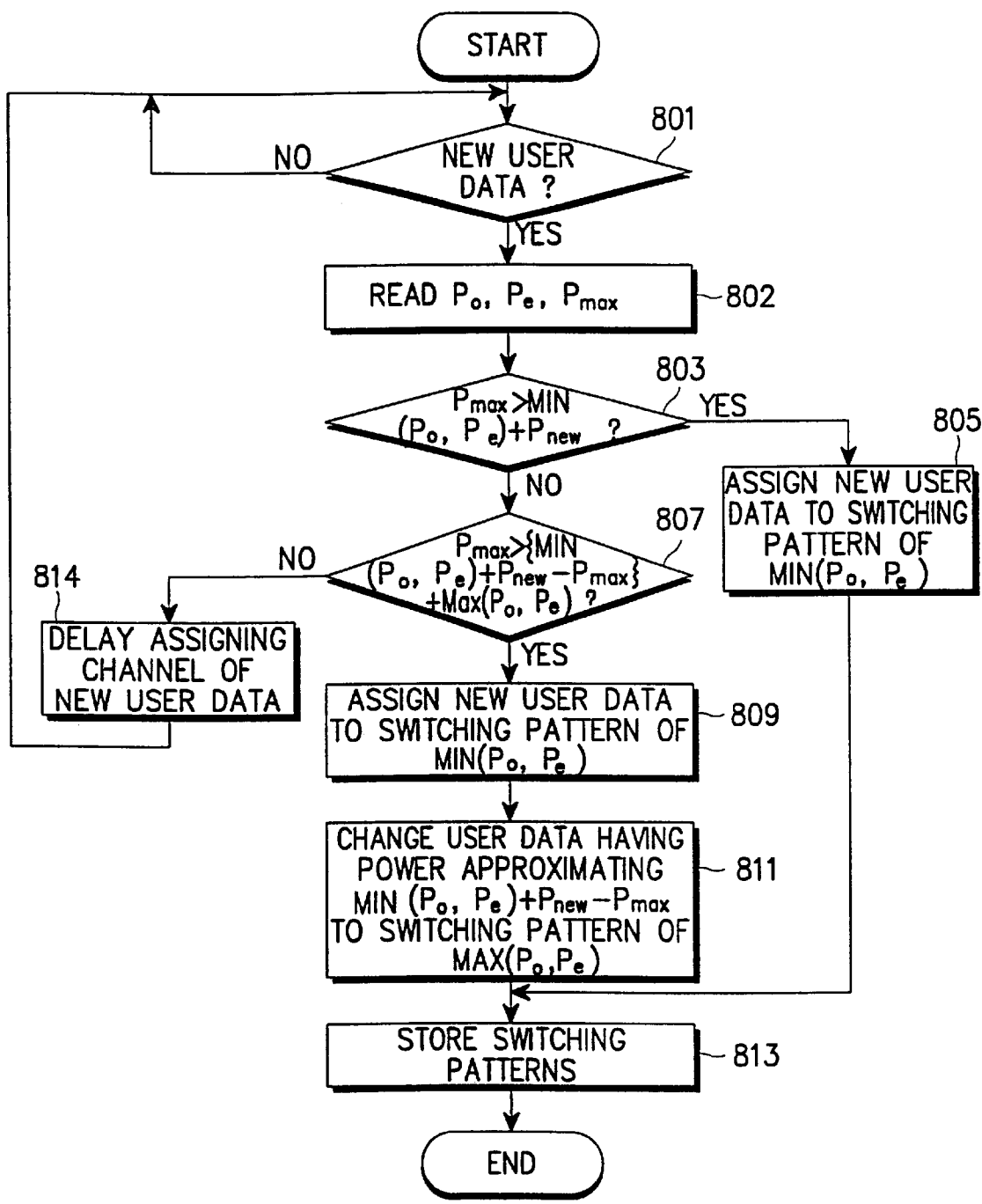
FIG. 6 is a flow chart illustrating a processing procedure for limiting a transmission power of an antenna according to the present invention.

FIG. 6 is a flow chart showing a processing procedure for limiting a transmission power of an antenna according to the present invention. The process illustrated in FIG. 6 is executed by the antenna pattern processor 130 shown in FIG. 5.

Referring to FIG. 6, the antenna pattern processor 130 checks through the data state detector 133 to determine whether new user data is generated from any user channel at step 801. If the new user data is generated, the antenna pattern processor 130 receives a power $P_{new}$ of the new user data, a data rate and QoS from the data state detector 133, and power information regarding previously generated user data along with a switching result of each controller 132. At step 802, the antenna pattern processor 130 reads powers $P_o$ and $P_e$ assigned to the first and second antennas ANT1 and ANT2 from the buffers 135 and 136, respectively, and reads the maximum transmission power $P_{max}$ from the pattern storage 138. The antenna pattern processor 130 checks whether the following equation is satisfied at step 803.

$$P_{max} > \text{MIN}(P_o, P_e) + P_{new} \qquad \text{Equation 5}$$

where "$\text{MIN}(P_o, P_e)$" is the lower power value of $P_o$ or $P_e$. If the above Equation 5 is satisfied, the new user data is assigned to a switching pattern of $\text{MIN}(P_o, P_e)$, and the assigned result is transmitted to a corresponding mobile station, at step 805.

If Equation 5 is not satisfied, the antenna pattern processor 130 searches for, from MIN(Po, Pe), user data which has a power approximating $\text{MIN}(P_o, P_e) + P_{new} - P_{max}$ at step 807. Here, a value obtained by adding the power of the searched user data to $\text{MAX}(P_o, P_e)$ should not exceed the maximum transmission power $P_{max}$. This can be expressed by the following equation:

$$P_{max} > \text{MIN}(P_o, P_e) + P_{new} - P_{max} + \text{MAX}(P_o, P_e)[\ldots(6)] \quad \text{Equation 6}$$

If no user data satisfies Equation 6, the antenna pattern processor 130 delays assigning a channel of the new user data at step 814 and then returns to step 801. If there is user data satisfying Equation 6, the power $P_{new}$ of the new user data is assigned to the switching pattern of $\text{MIN}(P_o, P_e)$ at step 809. At step 811, the searched user data having a transmission power approximating $\text{MIN}(P_o, P_e) + P_{new} - P_{max}$ is changed to a switching pattern of $\text{MAX}(P_o, P_e)$. Namely, the searched user data which has been assigned to the switching pattern of the second antenna is changed to the switching pattern of $\text{MAX}(P_o, P_e)$.

Figure 7A:
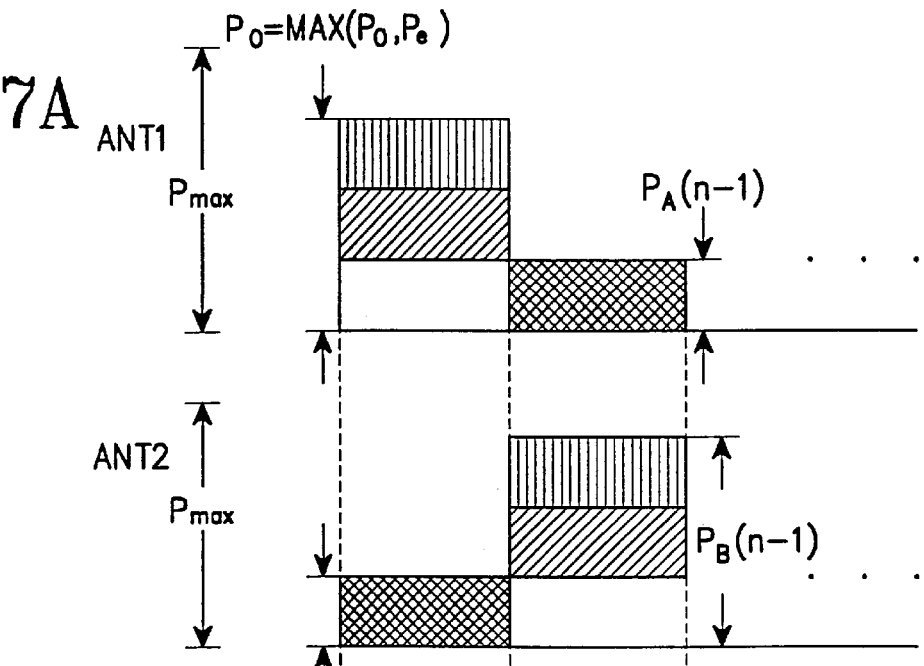
FIG. 7A illustrates one example of transmission powers assigned to antennas.
Figure 7B:
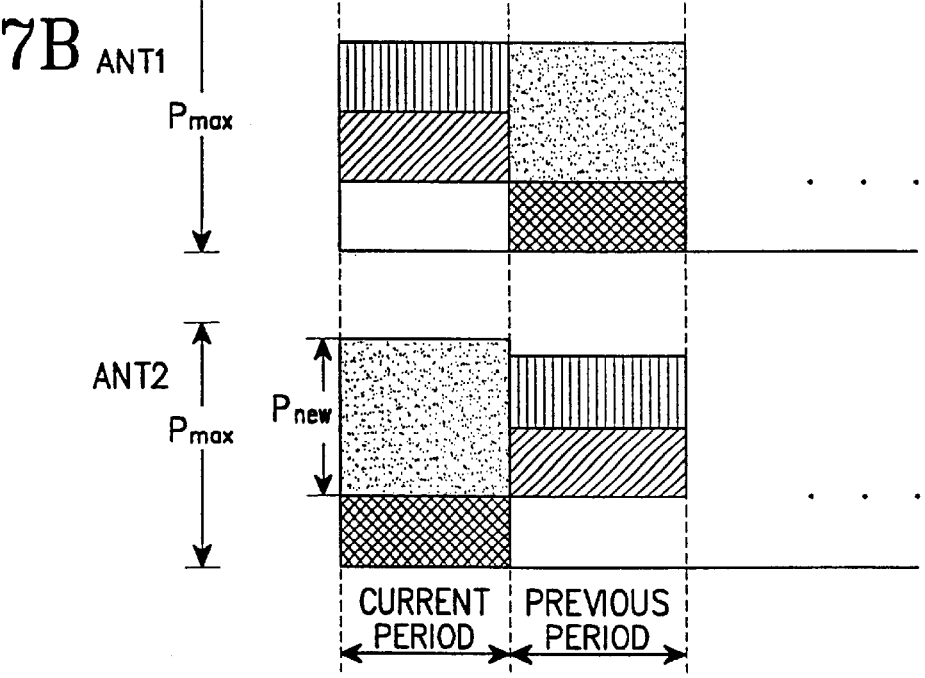
FIG. 7B illustrates the assignment of new user data power according to the present invention.

One example of steps 803 and 805 is illustrated in FIGS. 7A and 7B. FIG. 7A shows the case that even if the power $P_{new}$ of the new user data is assigned to $\text{MIN}(P_o, P_e)$, the entire power does not exceed the maximum transmission power $P_{max}$. In FIG. 7A, since the power $P_o$ assigned to the first antenna ANT1 at a current period is higher than the power $P_e$ assigned to the second antenna ANT2 at a current period, $P_o = \text{MAX}(P_o, P_e)$ and $P_e = \text{MIN}(P_o, P_e)$. More particularly, since the second antenna ANT2 has a lower power at a current period, the antenna pattern processor 130 assigns a switching pattern the user pattern having the power $P_{new}$ to the second antenna ANT2, as shown in FIG. 7B, by causing the corresponding controller 132 to switch the new user data to the second antenna ANT2. If $\text{MIN}(P_o, P_e) + P_{new}$ is not greater than $P_{max}$, step 805 is implemented.

Figure 8A:
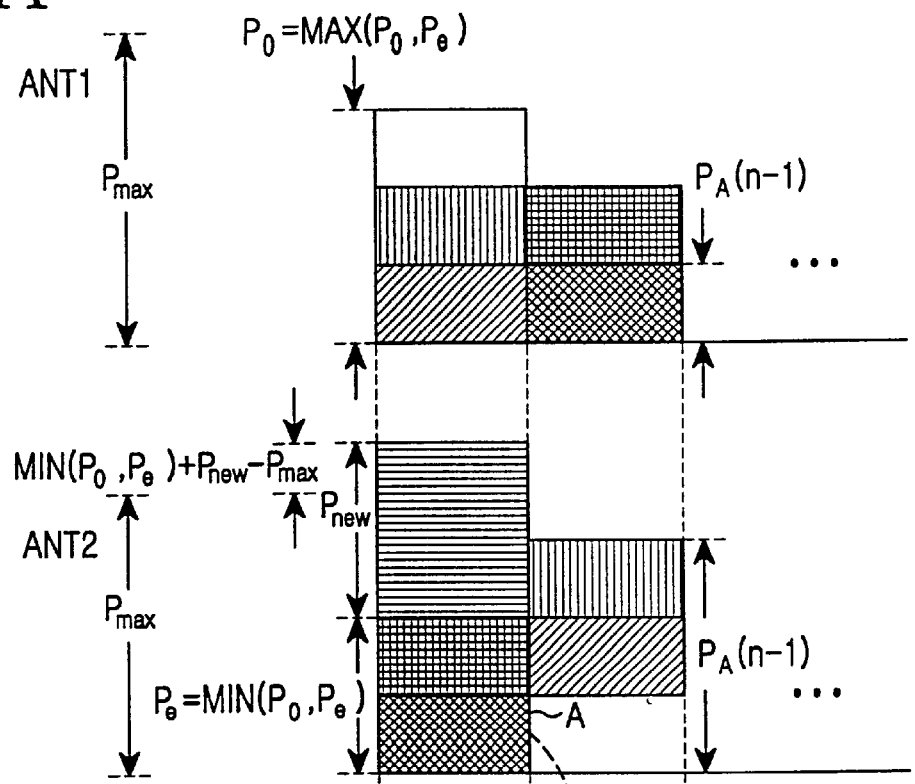
FIG. 8A illustrates another example of transmission powers assigned to antennas.
Figure 8B:
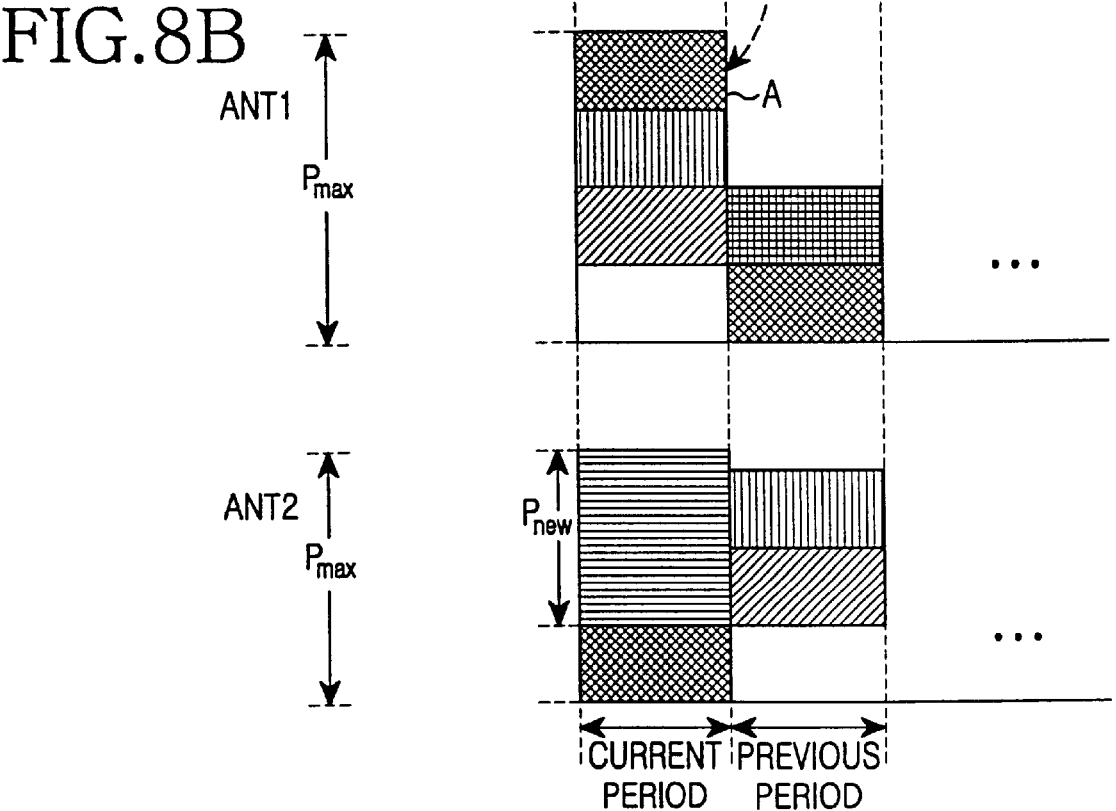
FIG. 8B illustrates the assignment of new user data and a change of a switching pattern according to the present invention.

A detailed description of steps 807 to 813 is provided herein by referring to FIGS. 8A and 8B. The antenna pattern processor 130 assigns the power $P_{new}$ at a current period to the second antenna ANT2 having a lower transmission power than the first antenna ANT1 as shown in FIG. 8A. However, since $\text{MIN}(P_o, P_e) + P_{new}$ is greater than $P_{max}$, the antenna pattern processor 130 searches for user data having a transmission power which is greater than and approximates $\text{MIN}(P_o, P_e) + P_{new} - P_{max}$. A user data having a low QoS and less pattern change is selected. Assuming that a power of such user data is "A", the antenna pattern processor 130 checks whether a value obtained by adding a power of the user data "A" to $\text{MAX}(P_o, P_e)$ (=$P_o$) is less than $P_{max}$. If so, the power $P_{new}$ of the new user data is assigned to the transmission power $P_e$ of the second antenna ANT2 at step 809, and the power of the user data "A" is assigned to the transmission power $P_o$ of the first antenna at step 811 as indicated in FIG. 8B. Referring back to FIG. 6, the antenna pattern processor 130 stores the pattern to which the new user data is assigned and the changed pattern in the pattern storage 138 at step 813.

In accordance with the present invention, the TSTD transmitter uses transmission amplifiers dissipating a low power by limiting a power of a signal transmitted through an antenna to a maximum transmission power and thus reduces complexity and cost in a base station.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A device for limiting a transmission power of an antenna in a time-switched transmission diversity (TSTD) transmitter of a base station of a mobile communication system including at least two antennas, a plurality of user channels, and a switching controller connected to the user channels, for switching user data received through the user channels to the antennas, said device comprising:

a data state detector connected to the user channels, for measuring a power of new user data on the user channels;

a transmission power detector for measuring transmission powers of signals transmitted through the antennas; and an antenna pattern processor for storing a maximum transmission power of the antennas and switching pattern information for previously assigned user data, determining a switching pattern for assigning the new user data to a specific antenna of which transmission power added to a power of the new user data does not exceed the maximum transmission power, and controlling the switching controller and updating the switching pattern information, according to the determined switching pattern.

2. The device as recited in claim 1, wherein the transmission power detector comprises:

a power detector for measuring transmission powers of the antennas; and a buffer for storing the measured transmission power values during a predetermined interval.

3. The device as recited in claim 2, wherein the transmission power detector includes a respective power detector and buffer corresponding to each antenna.

4. The device as recited in claim 1, wherein the antenna pattern processor includes a pattern storage for storing the maximum transmission power of each antenna and storing the switching pattern information to control the switching controller to switch the user data to the antennas.

5. The device as recited in claim 1, wherein the antenna pattern processor determines the switching pattern by assigning the power of the new user data to an antenna having the least transmission power, when all values obtained by adding the power of the new user data to the respective transmission powers of the antennas do not exceed the maximum transmission power.

6. A method for limiting a transmission power of an antenna in a time-switched transmission diversity (TSTD) transmitter of a base station of a mobile communication system, the system comprising at least two antennas and a pattern storage for storing a maximum transmission power limit value and switching patterns of a plurality of user data to be transmitted through the antennas, said method comprising the steps of:

measuring transmission powers assigned to the respective antennas upon receipt of new user data; and determining a switching pattern such that a value obtained by adding one of the transmission powers to a power of the new user data does not exceed the maximum transmission power limit value.

7. The method as recited in claim 6, wherein the step of determining a switching pattern comprises the steps of:

calculating a first power value, the first power value being a user data assigned minimum transmission power, by adding the power of the new user data to a minimum transmission power among the transmission powers;

checking whether the first power value is less than the maximum transmission power limit value;

searching for pattern change data having a power approximating a second power value which is obtained by subtracting a maximum transmission power limit value from the first power value, when the first power value is greater than the maximum transmission power limit value;

checking whether a third power value obtained by adding a power of the pattern change data to the maximum transmission power among the transmission powers is less than the maximum transmission power limit value; and assigning the new user data to the antenna having the minimum transmission power and changing a switching pattern of the pattern change data when the third power value is less than the maximum transmission power limit value.

8. The method as recited in claim 7, further comprising the step of assigning the power of the new user data to the minimum transmission power when the first power value is less than the maximum transmission power limit value.

9. The method as recited in claim 7, further comprising the step of delaying assigning a channel of the new user data when the third power value is greater than the maximum transmission power limit value.

* * * * *